US005858216A

United States Patent [19]
Wigen

[11] Patent Number: 5,858,216
[45] Date of Patent: Jan. 12, 1999

[54] FILTRATION AND REGENERATION SYSTEM

[76] Inventor: Gerald W. Wigen, 6841 Cardinal Cove Dr., Minnetrista, Minn. 55364

[21] Appl. No.: 739,721

[22] Filed: Oct. 29, 1996

[51] Int. Cl.[6] .................................................. B01D 35/02
[52] U.S. Cl. ................................ 210/90; 210/94; 210/190
[58] Field of Search .................................. 210/190, 191, 210/269, 90, 94, 266, 297, 411

[56] References Cited

U.S. PATENT DOCUMENTS

| 2,972,412 | 3/1961 | Lundeen | 210/123 |
| 3,079,949 | 3/1963 | Lundeen | 137/599.1 |
| 3,190,446 | 6/1965 | Griswold | 210/126 |
| 3,977,968 | 8/1976 | Odland | 210/687 |
| 4,889,623 | 12/1989 | Prior et al. | 210/190 |

*Primary Examiner*—Ivars Cintins
*Attorney, Agent, or Firm*—Hugh D. Jaeger

[57] ABSTRACT

A filtration and regeneration system for in line filtration of dirt and impurities from a brine/solution having contaminant flushing capabilities and a direct non-saturated feed of liquid resin cleaners to resins or filter media.

13 Claims, 2 Drawing Sheets

FILTRATION AND REGENERATION SYSTEM

BACKGROUND OF THE INVENTION

1. Field of the Invention

The present invention is for a liquid treatment system, and more particularly, pertains to a unique multi-purpose brine line filtration system, which filters brine water, displays brine line vacuum levels, and provides for injection of concentrated resin or filter media liquid cleaners into the corresponding pressure vessels.

2. Description of the Prior Art

Often times, the regeneration brine or chemicals used to regenerate such products as ion exchange systems or media type filtration systems, contain sediment, sand or other particulates. The existence of these impurities in brine feed water used for regeneration purposes, causes damage to regeneration control valves, as well as fouling of the resin, filtration media, and lower distribution systems. The filtration and regeneration system prevents these impurities from entering this equipment.

Resin cleaners, ion exchange resins or filtration media filters often require cleaners. These chemical cleaners are almost always harsh chemicals, which may cause injury or other health concerns if the operator is not careful when administering. These chemicals must be used in a liquid form, and are typically poured into the brine regeneration tank. Splash and spills are very common when this procedure is performed. In addition, once these chemicals are poured into the brine tank, they dilute with the brine liquid in the tank, which weakens the strength of the cleaners. As a result, more chemical is required.

The older conventional means filtering sediment from the brine draw liquid, was to use gravel in the bottom of the brine tank. This would trap and filter the brine liquid before it was drawn into the softener and/or filter resin tank.

To check for brine suction, it was necessary to disconnect the brine line at some point, attach a vacuum gauge, and then manually index the softener or filter to the brine draw position. Once the actual reading was completed, the disassembled brine line must be re-assembled.

To resin clean the softener/filter, it was necessary to pour a liquid concentration of cleaner into the systems brine tank. This procedure would dilute the cleaner with the liquid brine already in the tank. The other option was to remove the top tank cover of the softener/filter pressure vessel, drain down the tank, and pour the liquid cleaner in the top tank opening directly.

SUMMARY OF THE INVENTION

The general purpose of the present invention is to prevent sediment, sand or other particulate from causing damage to water softening and/or media filters during the brine cycle of normal regeneration. In addition, Brine Guard system displays brine suction by use of a vacuum gauge, and provides for uses of liquid resin or media cleaners without further dilution in the brine tank.

The purpose of this invention is to protect the water softener/filter from becoming damaged or fouled due to any sediment or particulate in the regenerate solution. The invention permits the operator/owner to usually observe the performance of the systems brine draw cycle, and the invention allows resin cleaning solutions to be used without unnecessary further dilution or disassembly of the entire system. Structural components are plastic with a stainless steel screen. An arrangement of valves and a pressure gauge in conjunction with a housing and a filter sump allow for filtration of brine/solution, flushing of contaminants and regeneration of filter/softener media and monitoring of system pressure.

The filtration and regeneration system is available in both a manual or automatic backwashing or flushing design, without the need for any disassembly to the system. This system relies on either water or air pressure for normal operation. All necessary shutoff valves, for repair or maintenance, are incorporated into each system. A single stainless steel screen, which spins as liquid passes through the system, forces particulate to the bottom of the system, where it is flushed for cleaning.

The filtration and regeneration system permits the owner or equipment operator to visually determine if the water treatment system is properly providing the necessary vacuum to inject, by suction, the required brine and/or other liquid chemicals used during a normal regeneration.

In addition, ion exchange resins and/or other filter media often require various types of cleaning chemicals. The filtration and regeneration system permits the owner/operator to inject, by vacuum, these concentrated chemicals into their equipment, without further diluting these chemicals with the brine water that is normally stored in the brine tank of their water softeners or filters.

One significant aspect and feature of the present invention is the filtration of sediment, sand or other particulates from a brine/solution used for regeneration of filter/softener media.

Another significant aspect and feature of the present invention is the use of a spin down mesh screen to direct sediment, sand or other particulates to the lower region of a sump.

Yet another significant aspect and feature of the present invention is the incorporation of a sump which can be drained without disassembly.

Still another significant aspect and feature of the present invention is the ability to readily and easily provide for the injection or resin cleaning media into a filter/softener tank for regeneration.

Still another significant aspect and feature of the present invention is the induction of filter/softener cleaners directly into the filter/softener tank without brine/solution dilution.

A further significant aspect and feature of the present invention is a pressure/vacuum gauge permitting the operator to immediately observe the brine suction vacuum level, to determine if proper brine draw is occurring. This visual inspection will alert the operator if a service problem is occurring in the brine cycle of regeneration.

A still further significant aspect and feature of the present invention is a clear plastic sump permitting the operator to visually see when the brine draw and brine refill cycles have been completed, as the flow of liquid ceases in each of these cycles. In addition, the clear sump allows the operator to visually see when the filtration and regeneration system needs to be flushed or cleaned.

A yet further significant aspect and feature of the present invention is the filtration and regeneration system shutoff valves permitting easy disassembly of the system for repair or maintenance, as well as serving to provide a safety shutoff means to make repairs to the brine solution tank, should they be necessary.

Having thus described embodiments of the present invention, it is the principal object of the present invention to provide a filtration and regeneration system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
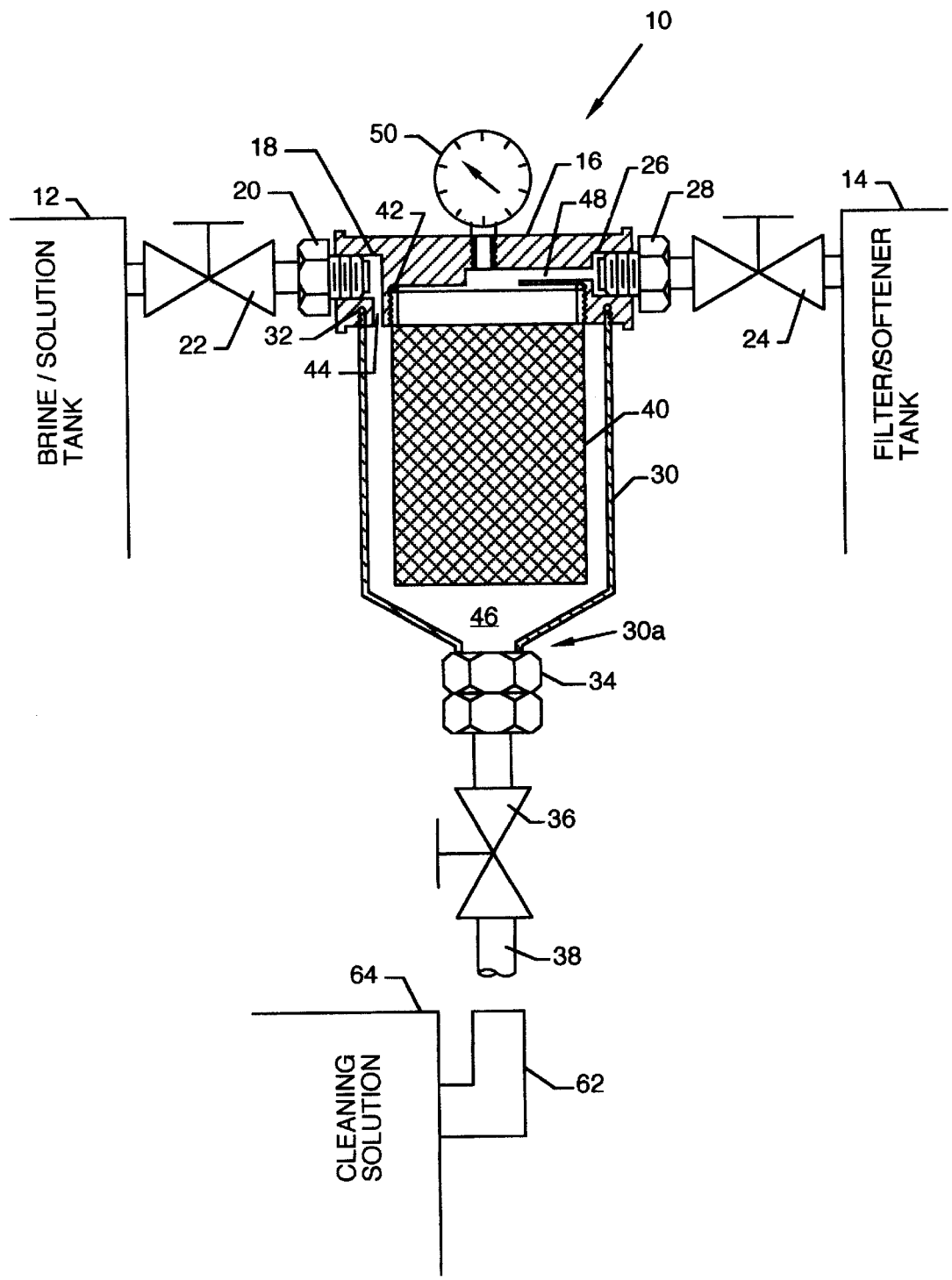
FIG. 1 illustrates a filtration and regeneration system.

FIG. 1 illustrates a filtration and regeneration system 10, the present invention, in use between a brine/solution tank 12 and a filter/softener tank 14. Non-corrosive metal or PVC component members are incorporated into the design of the present invention. A manifold housing 16, fashioned of PVC or other non-corrosive material, such as non-corrosive metal or plastic, is centrally located to serve as a mounting platform for various non-corrosive component members. A first or inlet port 18 is located at one end of the housing 16 for receiving of a nipple connector 20. A shutoff valve 22 is appropriately plumbed between the brine/solution tank 12 and the inlet port 18 via connector nipple 20. Correspondingly, a shutoff valve 24 is appropriately plumbed between the filter/softener tank 14 and a second or outlet port 26 via a connector nipple 28. A clear plastic filter sump 30 screwingly engages the lower portion of the housing 16 and is sealed thereto by an O-ring 32. The lower end 30a of the filter sump 30 is threaded or otherwise appropriately configured to receive a connector member 34 which is appropriately plumbed to a third or drain/shutoff valve 36 and tube 38 which is used as a shutoff for drainage or induction of cleaning fluids, as later described in detail. Located inside of the filter sump 30 is a fine mesh screen 40 which screwingly engages the lower portion of the housing 16 and is sealed thereto by an O-ring 42. The fine mesh screen 40 is a spin down type which rotates inside the sump as the screen 40 is exposed to liquid flow across the screen 40. Fluid inlet flow is provided into the filter sump 40 by a passage 44 located adjacent to the inlet post 18. Foreign objects suspended in liquid from the brine/solution are forced downwardly by the rotating spin down style fine mesh screen 40 to accumulate in the lower region 46 of the filter sump 30. Cleansed brine/solution is forced through the mesh screen 40 into a passage 48 in the housing 16 leading to the outlet port 26. The mesh screen can be a size such as 140. A pressure gauge 50 for indication of positive or negative pressure mounts to the upper region of the housing 16 and is plumbed to the passage 48.

Figure 2:
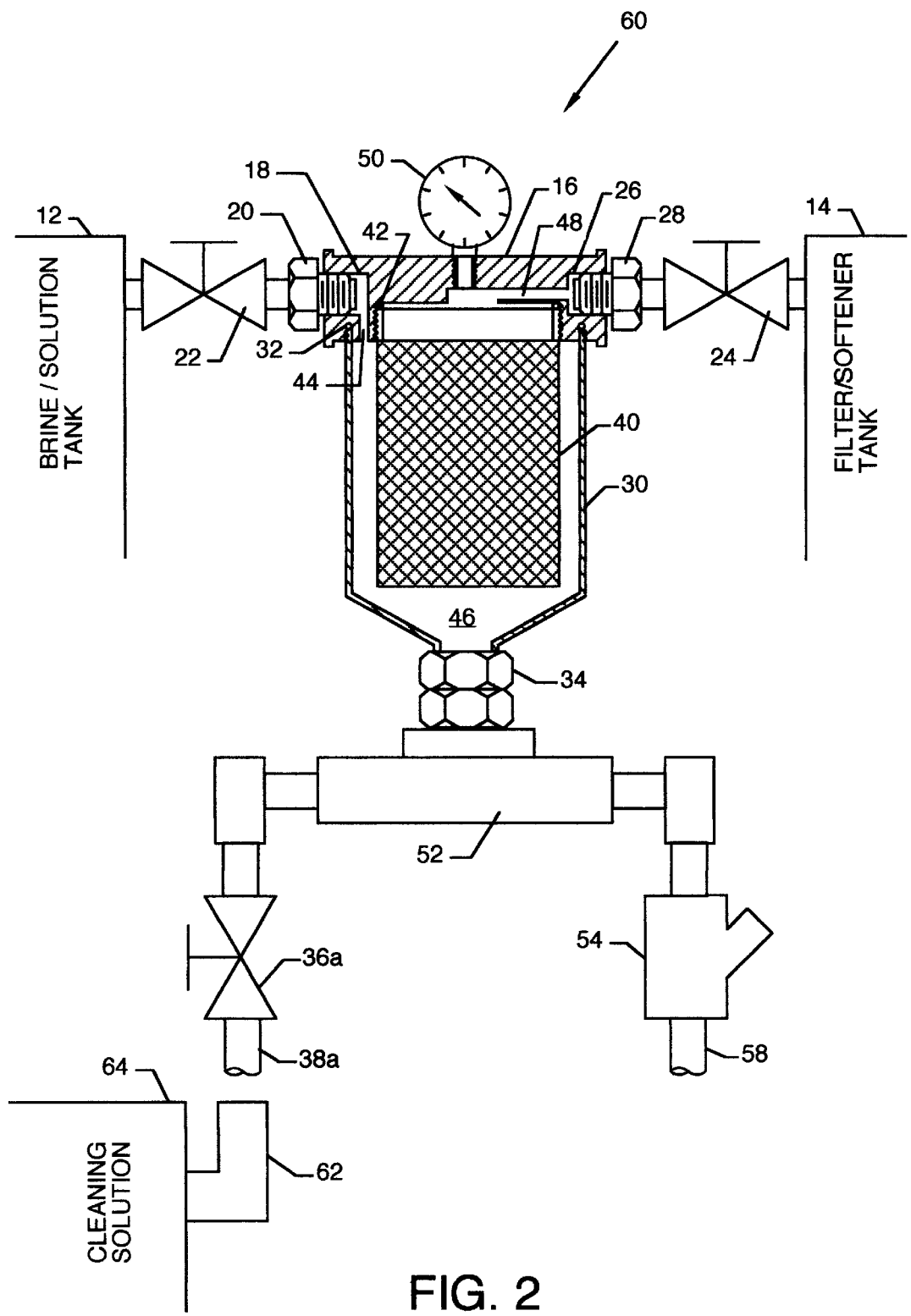
FIG. 2, a first alternative embodiment, illustrates a filtration and regeneration system having an optional flush arrangement.

FIG. 2, a first alternative embodiment, illustrates a filtration and regeneration system 60 which additionally includes an optional automatic backwash and flush arrangement, where all numerals correspond to those elements previously described. The arrangement in FIG. 2 includes the members illustrated in FIG. 1, where the shutoff valve 36 and tube 38, now designated as shutoff valve 36a and tube 38a, have been relocated and appropriately plumbed to one end of a manifold 52. Manifold 52 is internally plumbed to the interior of the filter sump 30 by the connector member 34. Also connected to the manifold 52 is a diaphragm valve 54 having a flow control 58.

MODE OF OPERATION

Normal operation of the filtration and regeneration system 10 is accomplished by flow of liquid from the brine/solution tank 12 through open shutoff valve 22. Brine/solution from the brine/solution tank 12 flows through passage 44 into the filter sump 30 and against the spin down mesh screen where dirt, sediment and the like are spun-off to and accumulated in the lower region 46 of the filter sump 30. Cleansed brine/solution is forced or drawn through the mesh system screen 40 and through the passage 48. From passage 48 the cleansed brine/solution passes through open shutoff valve 24 into the filter/softener tank 14 for regeneration of filter/softener media in the filter/softener tank 14. Timed pumping and drainage systems known to the art are incorporated to pump or draw brine/solution from the brine/solution tank 12 through the filtration and regeneration system 10 and to drain byproducts of regeneration from the filter/softener tank 14. Pressure gauge 50 indicates pressure or vacuum in the passage 48. Manual flushing of the filter sump 30 is accomplished by opening shutoff valve 36 during the pressurized mode to force contaminants and sediment in the lower region of the filter sump 30 through the tube 38 which can conveniently lead to a drain or sediment reservoir.

Also featured is a resin cleaning feature for cleaning of the interior members of the filtration system 10 and the regeneration media contained in the filter/softener tank 14. A flexible hose 62 can be connected to the tube 38 and led to a container of cleaner solution 64. The filter/softener tank apparatus is then indexed to the brine draw mode to provide a negative pressure in the passage 48 as evidenced by the reading on pressure gauge 50. The shutoff valve 22 is then manually closed and the shutoff valve 36 is manually opened. This condition now begins to empty, by suction, the cleaner solution container 64. Once the required amount of cleaner solution from the cleaner solution container 64 is used, the shutoff valve 36 is manually closed and shutoff valve 22 is manually reopened, thus restoring the filtration and regeneration system to normal operation. The mesh screen 40 can be accessed for cleaning or replacement by closing shutoff valves 22 and 24, and opening shutoff valve 36 to relieve pressure.

Operation of the filtration and regeneration system 60, now referenced to shutoff valve 36a and pipe 38a, is the same as that described for the filtration and regeneration system 10, but includes an automatic flush function for automatic flushing of the filter sump 30. Diaphragm valve 54 is actuated, such as by volumetric reference or timed reference, allowing contaminants to be removed from the lower region 46 of the filter sump 30 and dumped overboard through flow controller 58 to a drain or sediment reservoir. In the alternative, the flow controller valve 54 can be operator actuated by an input to the automatic valve 56.

Various modifications can be made to the present invention without departing from the apparent scope hereof.

I claim:

1. A filtration and regeneration system for filtering impurities from brine solution being delivered from a brine tank to a filter/softener tank, the filtration and regeneration system comprising:

a. an inlet shutoff valve, the inlet shutoff valve being attached to a brine tank, a manifold housing with an inlet port attached to said inlet shutoff valve, an outlet shutoff valve attached to an outlet port of said manifold housing, said outlet shutoff valve being further attached to a filter/softener tank;

b. a filter sump attached to said manifold housing, said filter sump further being attached to a drain/shutoff valve; and, c. a fine mesh screen contained in said filter sump and adjacent to said manifold housing for filtering out impurities.

2. The system of claim 1, including means for rotating said fine mesh screen inside said filter sump as it filters out impurities.

3. The system of claim 1, further comprising a cleaning solution container attached to said drain/shutoff valve.

4. The system of claim 3, including means for cleaning said filter/softener tank by closing said inlet shutoff valve, opening said outlet shutoff valve, and opening said drain/shutoff valve to allow cleaning solution contained in said cleaning solution container to pass into said filter/softener tank for cleaning without dilution with said brine solution.

5. A filtration and regeneration system for filtering impurities from brine solution being delivered from a brine tank to a filter/softener tank, the filtration and regeneration system comprising:

a. an inlet shutoff valve, the inlet shutoff valve being attached to a brine tank, a manifold housing with an inlet port attached to said inlet shutoff valve, an outlet shutoff valve attached to an outlet port of said manifold housing, said outlet shutoff valve being further attached to a filter/softener tank;

b. a filter sump attached to said manifold housing, said filter sump further being attached to a lower manifold, the lower manifold attached to and providing passage in parallel to a drain/shutoff valve and a diaphragm valve; and, c. a fine mesh screen contained in said filter sump and adjacent to said manifold housing for filtering out impurities.

6. The system of claim 5, including means for rotating said fine mesh screen inside said filter sump as it filters out impurities.

7. The system of claim 5, further comprising a cleaning solution container attached to said drain/shutoff valve.

8. The system of claim 7, including means for cleaning said filter/softener tank by closing said inlet shutoff valve, opening said outlet shutoff valve, and opening said drain/shutoff valve to allow cleaning solution contained in said cleaning solution container to pass into said filter/softener tank for cleaning without dilution with said brine solution.

9. The system of claim 7, wherein said manifold housing has a pressure gauge attached for indication of positive or negative pressure.

10. The system of claim 9, wherein said pressure gauge includes means for indicating a positive pressure indicative of brine passage into said filter/softener tank when said inlet shutoff valve is open, said outlet shutoff valve is open, and said drain/shutoff valve is closed.

11. The system of claim 9, wherein said pressure gauge includes means for indicating a positive pressure indicative of flushing the impurities from the filter sump when the inlet shutoff valve is open, the outlet shutoff valve is closed, and the drain/shutoff valve is open.

12. The system of claim 9, wherein said pressure gauge includes means for indicating a negative pressure indicative of passage of a cleaning solution from said cleaning solution container being drawn into said filter/softener tank when said inlet shutoff valve is closed, said outlet shutoff valve is open, and said drain/shutoff valve is open.

13. The system of claim 7, wherein said filter sump is clear to allow for visual evaluation of passage of said brine solution and visual examination of said fine mesh screen for amount of impurity deposit.

* * * * *